J. C. BETTS.
DENTAL PLUGGER.
APPLICATION FILED APR. 18, 1907.
901,276.
Patented Oct. 13, 1908.
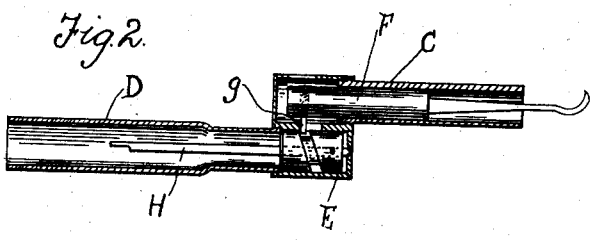
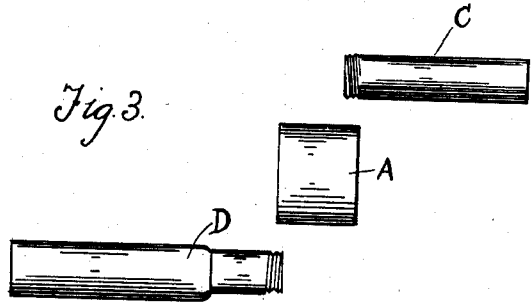
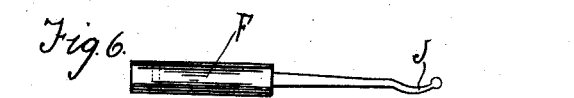
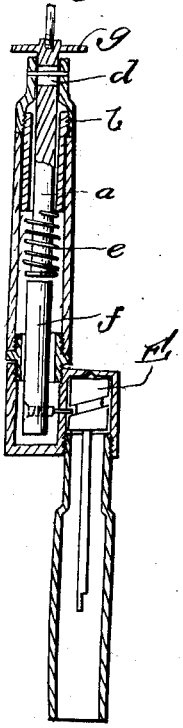
WITNESSES
INVENTOR
John C. Betts
BY
ATTORNEY

UNITED STATES PATENT OFFICE.

JOHN C. BETTS, OF PHILADELPHIA, PENNSYLVANIA.

DENTAL PLUGGER.

No. 901,276.

Specification of Letters Patent.

Patented Oct. 13, 1908.

Application filed April 18, 1907. Serial No. 368,839.

*To all whom it may concern:*

Be it known that I, JOHN C. BETTS, a citizen of the United States, residing at Philadelphia, county of Philadelphia, and State of Pennsylvania, have invented certain new and useful Improvements in Dental Pluggers, of which the following is a specification.

My invention relates to a new and useful improvement in dental pluggers, and has for its object to provide an exceedingly simple and effective device of this description which may be utilized for operating the plugger tools which are now mostly used by hand, and in addition to plugging tools, scrapers and saws may be advantageously operated by the same mechanism, thus greatly facilitating the work of a dentist.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawings forming a part of this specification, in which—

Figure 1 is a side view of the preferred form of my improved tool. Fig. 2, a longitudinal section thereof showing the interior working parts. Fig. 3, details of the several pieces of which the casing is composed. Fig. 4, a detail of the operating cam and its spindle. Fig. 5, a similar view of the scraping tool. Fig. 6, a similar view of a plugging tool. Fig. 7, an enlarged view of the cam screw showing a roll upon the end thereof for reducing friction between said screw and cam. Fig. 8, is a section of a still further modification of my invention.

In carrying out my invention as embodied in Figs. from 1 to 8, A represents the body of the casing, which has threaded therein the barrel or sleeve C, while in the opposite side of said body is threaded the handle D. The interior casing is divided by a slotted mid wall into two compartments, as clearly shown in Fig. 2, the lower compartment being adapted to receive and house the cam E, which is held against longitudinal movement by the inner end of the handle D.
Within the upper compartment projects the tool holder F of any particular form of implement which at the time is being used, and through this tool holder is threaded the screw G, the inner end of which terminates in a pin $g$ projecting into the groove of the cam E, so that when said cam is revolved this pin will be reciprocated back and forth, thus reciprocating the tool holder F, and consequently the implement carried thereby or formed therewith.

The cam has formed thereon the spindle H, which is adapted to engage the chuck of a flexible shaft whereby it will be rotated, as is well understood in dentistry.

In Figs. 1, 2 and 5 I have shown a scraper formed with or attached to the tool holder, and when this implement is used the operation of my improvement will be as follows:—

The cam being set in motion by the ordinary dental engine, the scraper will be reciprocated back and forth at a high rate of speed, when the operator has only to insert the scraper in the mouth of the patient and bring it into contact with the surfaces to be scraped, when this constant reciprocation thereof will accomplish the work, entirely relieving the operator of the awkward movement of scraping, and permitting him to give his entire attention to the application of the tool to the proper surfaces, the work being done by the dental engine.

Where a plugger is used, as shown at J, in Fig. 6, the bringing of the plugging implement into contact with the surfaces to be hammered in conjunction with the constant reciprocation of the implement will produce the blow effect necessary to proper plugging, so that the operator has only to remove and replace the plugging point from time to time to proceed with the work.

In Fig. 8 I have shown a still further modification of my improvement in which the tool holder $a$ is fitted to slide in the extension $b$ and prevented from removal by the pin $d$. The spring $e$ forces the tool holder in one direction while the plunger $f$ actuated by the cam E striking the tool holder will impart the blow to the plugging implement.

$g$ is a collar secured to the tool holder by which the operator can slide the tool holder out of the field of action of said plunger, thus stopping the movements of the plunger and facilitating the picking up of the filling material.

Having fully described my invention, what I claim as new and useful, is—

1. In a dental tool, a casing formed with two compartments separated by an apertured mid wall, the compartments having relatively opposite open ends a cylindrical body disposed in one compartment, said body being formed with a cam groove, a handle secured to said casing and to hold said body against longitudinal movement, said body carrying a spindle for attachment to an engine shaft, a tool holder disposed in the other compartment for longitudinal reciprocating movement and a pin projecting laterally from the inner end of said holder through the opening in the mid wall, said pin having its end engaged in the cam groove.

2. In a dental tool, a casing formed with two compartments, separated by an apertured mid wall, the compartments having relatively opposite open ends, a tubular handle engaged in the open end of one compartment, a sleeve engaged in the open end of the other compartment, a cylindrical body disposed for rotation in the first compartment, said body being formed with a cam groove, a tool holder mounted to slide in said sleeve and in the second compartment, a tool secured in said holder to move therewith and projecting beyond the sleeve, and a pin projecting laterally from the inner end of the tool holder through the aperture in the mid wall and into the cam groove of said cylindrical body.

In testimony whereof, I have hereunto affixed my signature in the presence of two subscribing witnesses.

JOHN C. BETTS.

Witnesses:
   JOSEPH C. SMITH,
   S. M. GALLAGHER.